(12) United States Patent
Koller et al.

(10) Patent No.: US 11,092,332 B2
(45) Date of Patent: Aug. 17, 2021

(54) ONCE-THROUGH EVAPORATOR SYSTEMS

(71) Applicant: GENERAL ELECTRIC TECHNOLOGY GMBH, Baden (CH)

(72) Inventors: Petrus Johannes Koller, Leutwil (CH); Rudolf Zinniker, Zurich (CH); Hans Ulrich Lenherr, Lengnau (CH); Alexander Taylor, Baden (CH); Stefan Lukas Gysel, Buchberg (CH)

(73) Assignee: General Electric Technology GmbH, Baden (CH)

( * ) Notice: Subject to any disclaimer, the term of this patent is extended or adjusted under 35 U.S.C. 154(b) by 64 days.

(21) Appl. No.: 16/194,044

(22) Filed: Nov. 16, 2018

(65) Prior Publication Data
US 2019/0178490 A1    Jun. 13, 2019

(30) Foreign Application Priority Data

Dec. 8, 2017    (EP) .................................... 17206084

(51) Int. Cl.
| | | |
|---|---|---|
| *F22B 35/10* | (2006.01) | |
| *F22B 29/06* | (2006.01) | |
| *F22B 1/08* | (2006.01) | |
| *F22B 1/18* | (2006.01) | |
| *F22B 35/18* | (2006.01) | |
| *G05D 23/19* | (2006.01) | |

(52) U.S. Cl.
CPC ............ *F22B 35/108* (2013.01); *F22B 29/06* (2013.01); *F22B 35/10* (2013.01); *F22B 35/102* (2013.01); *F22B 1/08* (2013.01); *F22B 1/1807* (2013.01); *F22B 35/18* (2013.01); *G05D 23/1934* (2013.01)

(58) Field of Classification Search
CPC .......... F22B 1/08; F22B 1/1807; F22B 29/06; F22B 35/10; F22B 35/102; F22B 35/108; F22B 35/18; G05D 23/1934
USPC ....................................................... 122/479.7
See application file for complete search history.

(56) References Cited

U.S. PATENT DOCUMENTS

| | | | |
|---|---|---|---|
| 3,610,025 A | 10/1971 | Brunner | |
| 3,769,942 A | 11/1973 | Brehler | |
| 4,144,846 A | 3/1979 | Miszak | |
| 4,445,180 A | 4/1984 | Davis et al. | |
| 4,558,227 A * | 12/1985 | Yanada | F22B 35/18 290/40 R |
| 4,781,324 A | 11/1988 | Jensen | |

(Continued)

OTHER PUBLICATIONS

EP Search Report and Written Opinion dated May 28, 2018 which was issued in connection with EP patent application 17206082.4 which was filed on Dec. 8, 2017.

(Continued)

*Primary Examiner* — Steven B McAllister
*Assistant Examiner* — Benjamin W Johnson
(74) *Attorney, Agent, or Firm* — Fletcher Yoder, P.C.

(57) ABSTRACT

The present application provides a once-through evaporator system. The once-through evaporator system may include a number of once-through evaporator sections with a distribution valve and a level sensor and a controller in communication with each distribution valve. The controller provides the distribution valve with a position set point and biases the position set point via a feedforward signal based on a fill level as determined by the level sensor in each of the once-through evaporator sections.

15 Claims, 14 Drawing Sheets

(56) References Cited

U.S. PATENT DOCUMENTS

| | | | |
|---|---|---|---|
| 4,869,210 A | 9/1989 | Wittchow | |
| 6,173,679 B1 | 1/2001 | Bruckner et al. | |
| 2003/0213246 A1* | 11/2003 | Coll | F01K 17/02 |
| | | | 60/653 |
| 2006/0192023 A1 | 8/2006 | Franke et al. | |
| 2011/0139094 A1 | 6/2011 | Bruckner et al. | |
| 2013/0192229 A1 | 8/2013 | Bruckner et al. | |
| 2014/0110092 A1 | 4/2014 | John et al. | |
| 2015/0176878 A1* | 6/2015 | Olia | F22B 35/102 |
| | | | 62/222 |
| 2017/0307207 A1 | 10/2017 | Bruckner et al. | |

OTHER PUBLICATIONS

EP Search Report and Written Opinion dated May 30, 2018 which was issued in connection with EP patent application 17206084.0 which was filed on Dec. 8, 2017.
EP Search Report and Written Opinion dated Jul. 17, 2018 which was issued in connection with EP patent application 17206087.3 which was filed on Dec. 8, 2017.
EP Search Report and Written Opinion dated May 28, 2018 which was issued in connection with EP patent application 17206086.5 which was filed on Dec. 8, 2017.
Petrus Johannes Koller et al., filed Dec. 8, 2017, EP 17206082.4.
Chuan Wang al., filed Dec. 8, 2017, EP 17206087.3.
Petrus Johannes Koller et al., filed Dec. 8, 2017, EP 17206086.5.

* cited by examiner

ONCE-THROUGH EVAPORATOR SYSTEMS

TECHNICAL FIELD

The present application and resultant patent relate generally to gas turbine engines and more particularly relate to combined cycle systems with heat recovery steam generators having once-through evaporators with combined closed loop and open loop control systems.

BACKGROUND OF THE INVENTION

Generally described, combined cycle systems may include a gas turbine, a steam turbine, and a heat recovery steam generator. The heat recovery steam generator may extract heat from the hot combustion gases from the gas turbine to produce steam to drive the steam turbine. The heat recovery steam generator may include an economizer to heat a flow of feedwater, an evaporator to turn the flow of feedwater into saturated steam, and a superheater to turn the flow of saturated steam into superheated steam. One example of an evaporator for use with a heat recovery steam generator may be a once-through evaporator. In a once-through evaporator, the incoming flow of feedwater is completely evaporated before reaching the superheater. The once-through evaporator may include a number of parallel evaporator sections in communication with the flow of combustion gases.

Once-through evaporators must contain an adequate volume of feedwater when the gas side of the evaporator exceeds a certain temperature to ensure a smooth transition to a controlled steam outlet temperature without exceeding evaporator temperature and/or temperature gradient limits. Conventionally, this was achieved by filling the evaporator completely prior to the start. About half of this initial fill, however, may be ejected to a water separator and rejected to waste during start-up procedures. Moreover, this filling procedure may cool down the overall heat recovery steam generator, reduce pressure, and delay steam production.

Once loading has begun, the flow of feedwater may be controlled by a main feedwater control valve while distribution valves on each evaporator section may be used to control the temperature therethrough. This configuration, however, may lead to a non-linear relationship between valve position and temperature, particularly at low loads. Conventional closed loop controls may not receive sufficient feedback to prevent oscillatory issues. Moreover, steam temperature alone may not be a reliable or timely indicator of the require feedwater mass flow, particularly during transient events. Other types of operational parameters thus may be considered.

SUMMARY OF THE INVENTION

The present application and the resultant patent thus provide a once-through evaporator system. The once-through evaporator system may include a number of once-through evaporator sections with a distribution valve and a level sensor and a controller in communication with each distribution valve. The controller provides the distribution valve with a position set point and biases the position set point via a feedforward signal based on a fill level as determined by the level sensor in each of the once-through evaporator sections.

The present application and the resultant patent further provide a method of starting a once-though evaporator system. The method may include the steps of feeding feedwater into a once-through evaporator section for a predetermined flow rate for a predetermined time, controlling the feedwater flow rate via a dynamic feedforward signal, and controlling the feedwater flow rate via the dynamic feedforward signal and temperature feedback control based on once-through evaporator section exit temperatures.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
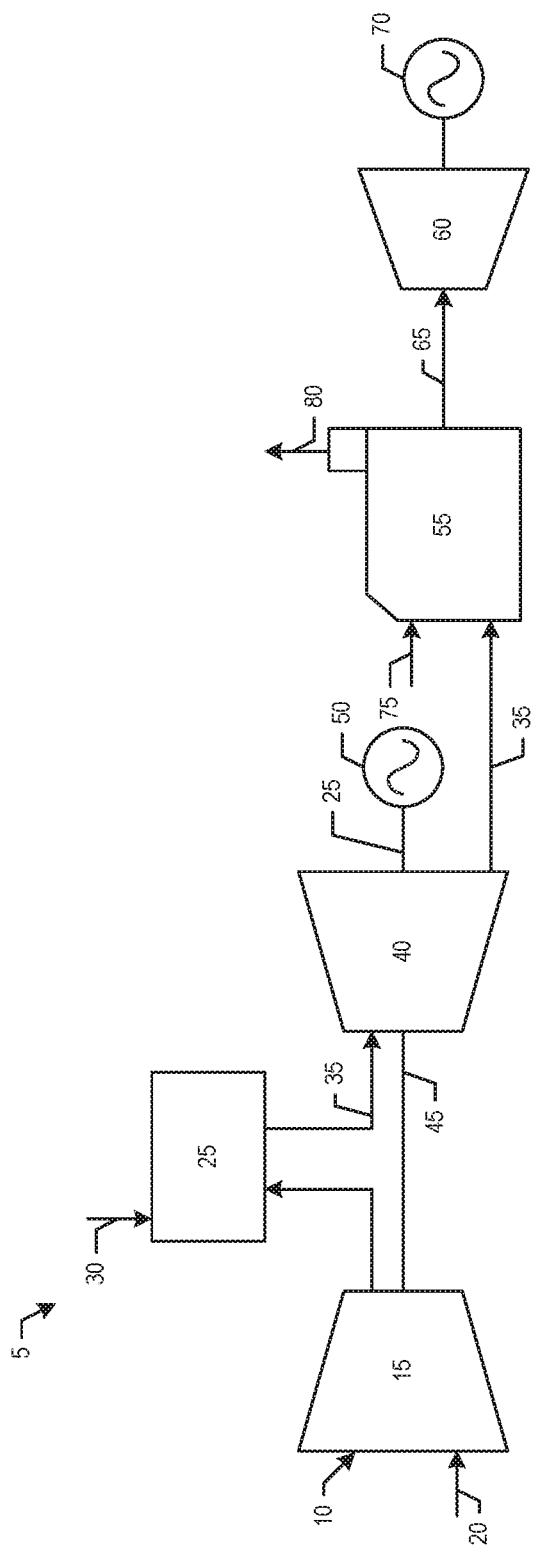
FIG. 1 is a schematic diagram of an example of a combined cycle system.

Referring now to the drawings, in which like numerals refer to like elements throughout the several views, FIG. 1 shows a schematic diagram of a combined cycle system 5 as may be used herein. The combined cycle system 5 may include a gas turbine engine 10. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The combined cycle system 5 may include a heat recovery steam generator 55 and a steam turbine 60. The hot combustion gases 35 exiting the gas turbine engine 10 may be supplied to the heat recovery steam generator 55. The heat recovery steam generator 55 may recover heat from hot combustion gases 35 exiting the gas turbine engine 10 to create steam 65 for expansion in the steam engine 65. The steam engine 65 may drive an external load 70, such as a further electrical generator and the like (a common generator also may be used.)

The heat recovery steam generator 55 may have one or more pressure sections, such as a high-pressure section, an intermediate-pressure section, and a low-pressure section. Each pressure section may include any combination of evaporators, superheaters, and/or economizers. Each of these components typically includes a bundle of tubes across which the hot combustion gases 35 flow, transferring heat from the hot combustion gases 35 to a fluid (e.g., feedwater 75) flowing through the tubes. For example, the evaporator may include feedwater 75 flowing through its tubes and the hot combustion gases 35 may cause the feedwater 75 to turn to steam 65. The superheater may include steam 65 flowing through its tubes and the hot combustion gases 35 may heat the steam 65 to create superheated steam. The economizer may include feedwater 75 flowing through its tubes and the hot combustion gases 35 may preheat the feedwater 75 for use in the evaporator. The combustion gas 35 may exit the heat recovery steam generator as cool exhaust gas 80.

Figure 2:
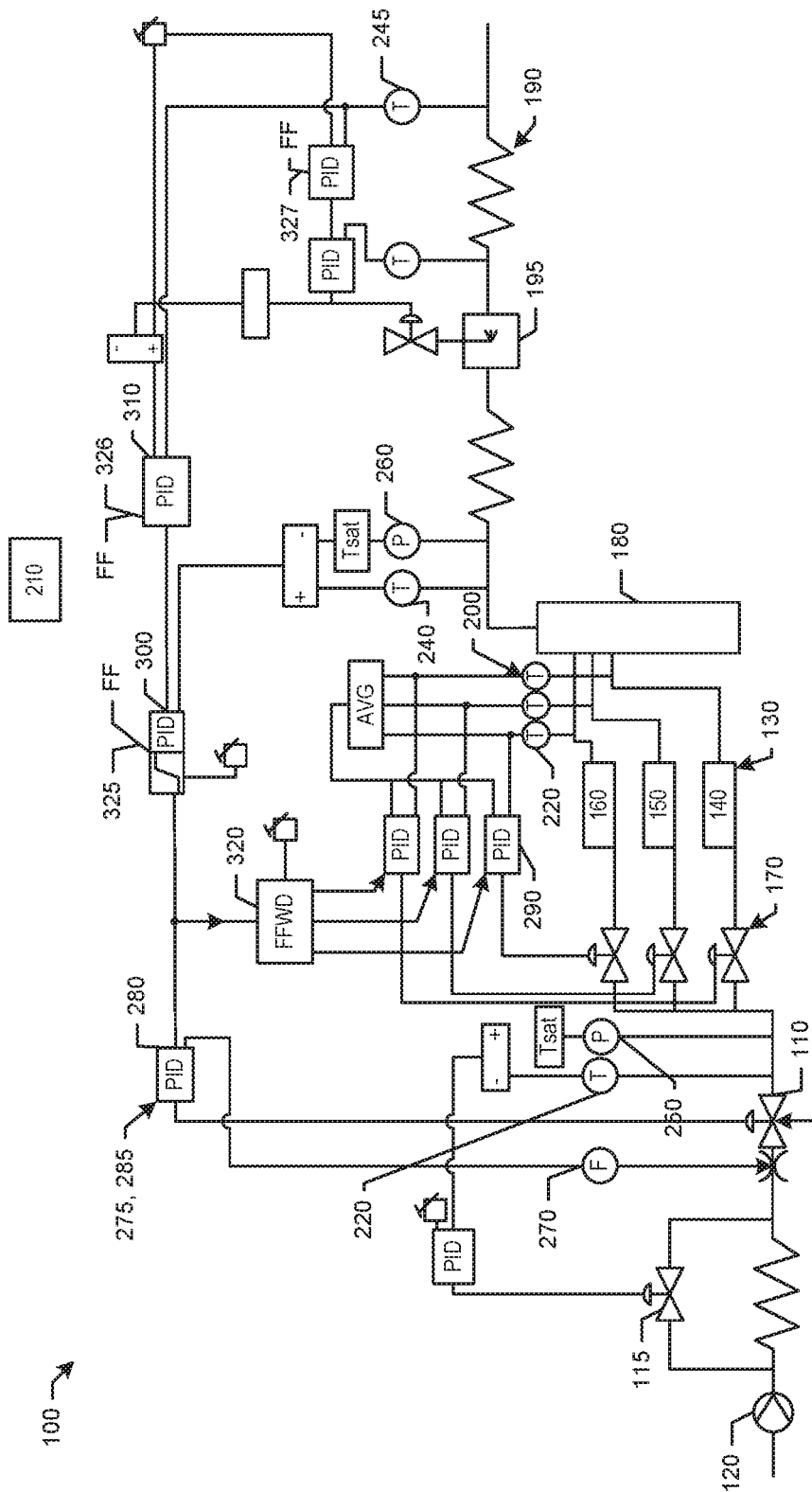
FIG. 2 is a schematic diagram of an example of a once-through evaporator system as may be described herein.

FIG. 2 shows an example of a once-through evaporator system 100 as may be described herein. The once-through evaporator system 100 may be used with the heat recovery steam generator 55 and the like. The once-through evaporator system 100 may be configured to receive feedwater 75 from an economizer and output superheated steam to the steam turbine 60. The feedwater temperature may be controlled with an bypass valve 115 to achieve the required amount of subcool to ensure that the feedwater 75 remains in the liquid phase. The once-through evaporator system 100 may include a main control valve 110 that regulates the total flow of feedwater 75 through the once-through evaporator system 100 from a feedwater pump 120 and the like. The once-through evaporator system 100 may include a number of parallel once-through evaporator sections 130. In this example, a first evaporator section 140, a second evaporator section 150, and a third evaporator section 160 are shown, although any number of once-through evaporator sections 130 may be used herein. Each of the once-through evaporator sections 130 may include a number of evaporator tubes therein for the flow of feedwater 75. Each of the once-through evaporator sections 130 may have a distribution valve 170 upstream thereof. The distribution valves 170 control the flow of feedwater 75 to each of the once-through evaporator sections 130. The flow from each of the once-through evaporator sections 130 may be combined and sent to a water separator 180. Steam resulting from the separation process of the water separator 180 may be provided to a number of superheaters 190. Temperature control about the superheaters 190 may be provided by one or more attemperators 195. Superheated steam may be provided to drive the steam turbine 60.

The once through evaporator system 100 may include a number of sensors 200 in communication with one or more processors 210. The processors 210 may be any type of programmable logic device. The sensors 200 may include a number of temperature sensors including a feedwater temperature sensor 220 positioned upstream of the evaporator sections 130 and a number of evaporator section temperature sensors 230 positioned downstream of each of the once-through evaporator sections 130. A temperature sensor 240 may be positioned about the water separator 180. A number of exit temperature sensors 245 may be positioned about the superheaters 190. Other types of temperature sensors may be used herein. A number of pressure sensors also may be used herein. In this example, an upstream pressure sensor 250 and a downstream pressure sensor 260 may be used on either side of the once-through evaporator sections 130. A number of flow meters 270 and the like also may be used. Other types of sensors 200 may be used herein.

The once-through evaporator system 100 also may include a number of controllers 275 and the like in communication with the sensors 200 and the processor 210. The controllers 275 may be Proportional-Integral-Derivative (PID) controllers 285. Generally described, the proportional term considers how far a measured process variable (PV) is from a set point (SP) at any instant in time, i.e., the error. The integral term considers how long and how far the PV has been away from the SP. The derivative term considers how fast or the rate at which the PV is changing.

Example controllers 275 include a feedwater flow controller 280 in communication with the main control valve 110. A distribution valve controller 290 may be used with each of the distribution valves 170. Other controllers may include an evaporator section temperature controller 300 and an exit stage temperature controller 310. The sensors 200, the processor 210, the various controllers 275 control the operation of the once-through evaporator 100 via different types of feedback and feedforward instructions. Specifically, these controllers 275 may incorporate open loop feedforward (FFWD) signals 320, 326, 327, and dynamic feedforward (DFFWD) signals 325. As will be described in more detail below, the use of multiple controllers 275 may provide overall cascade control. For example, the exit stage temperature controller 310 may generate an evaporator outlet temperature or superheat setpoint, the evaporator section temperature or superheat controller 300 may generate a feedwater flow setpoint, and the feedwater flow controller 280 may act on the main control valve 110 and/or a feedwater pump speed controller.

Figure 3:
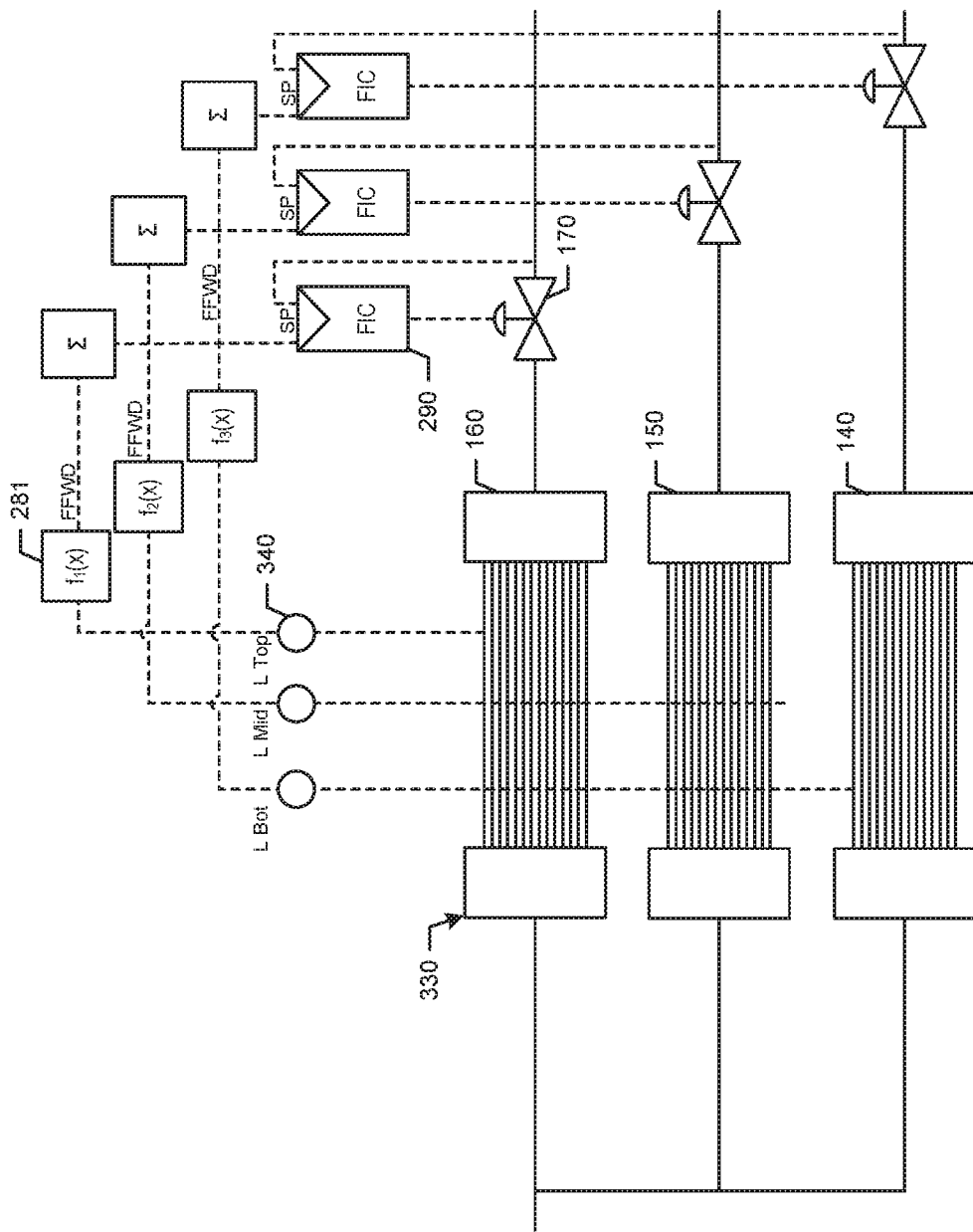
FIG. 3 is a schematic diagram of an example of a start-up filling system that may be used with the once-through evaporator system of FIG. 2.

As is shown in FIG. 3, the once-through evaporator system 100 may include a start-up filling system 330. The once-through evaporator sections 130 need an adequate amount of water therein to ensure a smooth transition to controlled steam generation. The start-up filling system 330 thus may use a number of level indicators 340 positioned about each of the once-through evaporator sections 130. The level indicators 340 may be in communication with a filling mode flow offset calculator 281 281 which determines the filling mode flow rate offset or bias to the distribution valve controllers 290 of each distribution valve 170. The start-up filling system 330 thus ensures that each once-through evaporator section 130 has sufficient water during start-up to prevent overheating and ensure stable steam production.

Figure 4:
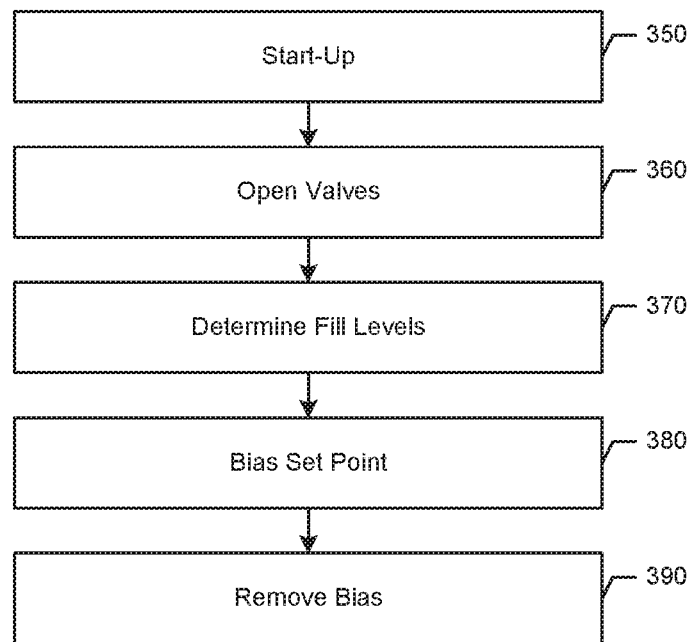
FIG. 4 is a flow chart of exemplary method steps in the start-up filling procedure with level instruments of the once-through evaporator system of FIG. 2.

FIG. 4 shows an example of the start-up filling system 330 in use. At step 350, start-up begins. At step, 360 the main control valve 110 and the distribution valves 170 are opened. At step 370, the level indicators 340 determine the volume of feedwater 75 in each of the filling mode flow offset calculator 281 evaporator sections 130. Steps 360 and 370 are interchangeable, depending on the method of level measurement. At step 380, the filling mode flow offset calculator 281 uses this information to generate a feedforward signal 320 to the distribution valve controllers 290 so as to bias the flow set-point for a proportional reduction or increase in flow demand. Once-through evaporator sections 130 which have a sufficient amount of water may have their flow set-points proportionally reduced while sections with an insufficient volume of water will have their set-points proportionally increased. The start-up filling system 330 thus ensures an adequate distribution of feedwater 75 at start-up but without the waste of feedwater caused by filling the once-through evaporator sections 130 before start-up. At step 390, once steam generation has begun, as indicated by the evaporator section temperature sensors 230 or otherwise, the bias may be removed and the filling mode may be considered complete.

Figure 5:
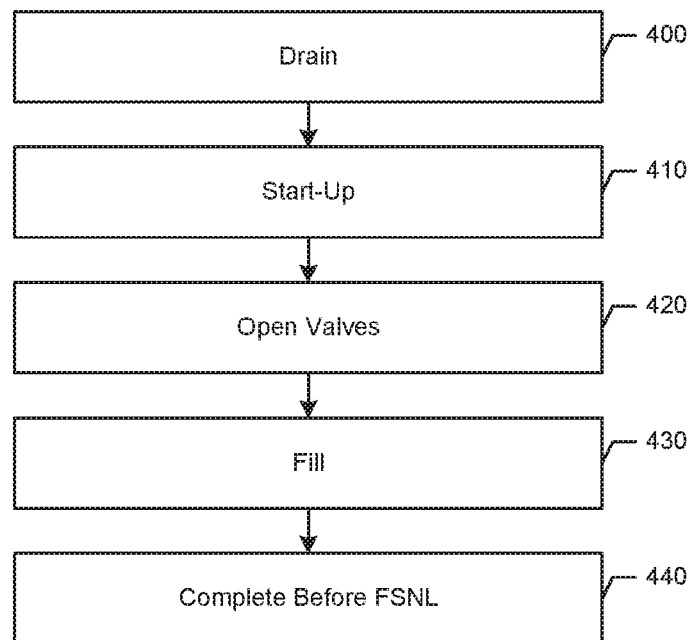
FIG. 5 is a flow chart of exemplary method steps in the start-up filling procedure without level instruments of the once-through evaporator system of FIG. 2.

FIG. 5 shows the use of the start-up filling system 330 without the level indicators 340. In order to generate a defined starting condition, each once-through evaporator section 130 may be drained at step 400 at shut down. Hot draining after shut down may assist in long term dry storage of the once-through evaporator sections 130 and the superheater sections 190. Draining also ensures uniform filling of the once-through evaporator sections 130 at start-up. Optionally, the draining step may be skipped on occasion. At step 410, start-up begins. At step, 420 the main control valve 110 and the distribution valves 170 are opened. At step 430, filling is done at a defined flow rate for a defined time to feed a defined volume of feedwater 75 into each of the once-through evaporator sections 130. At step 440, filling should be complete before the gas turbine 10 reaches certain exhaust gas conditions, e.g., full speed no load conditions. The start-up filling system 330 thus provides reduced water consumption during start-up, increased stability of control, reduced occurrence of water shootout, and increased overall component lifetime.

Figure 6:
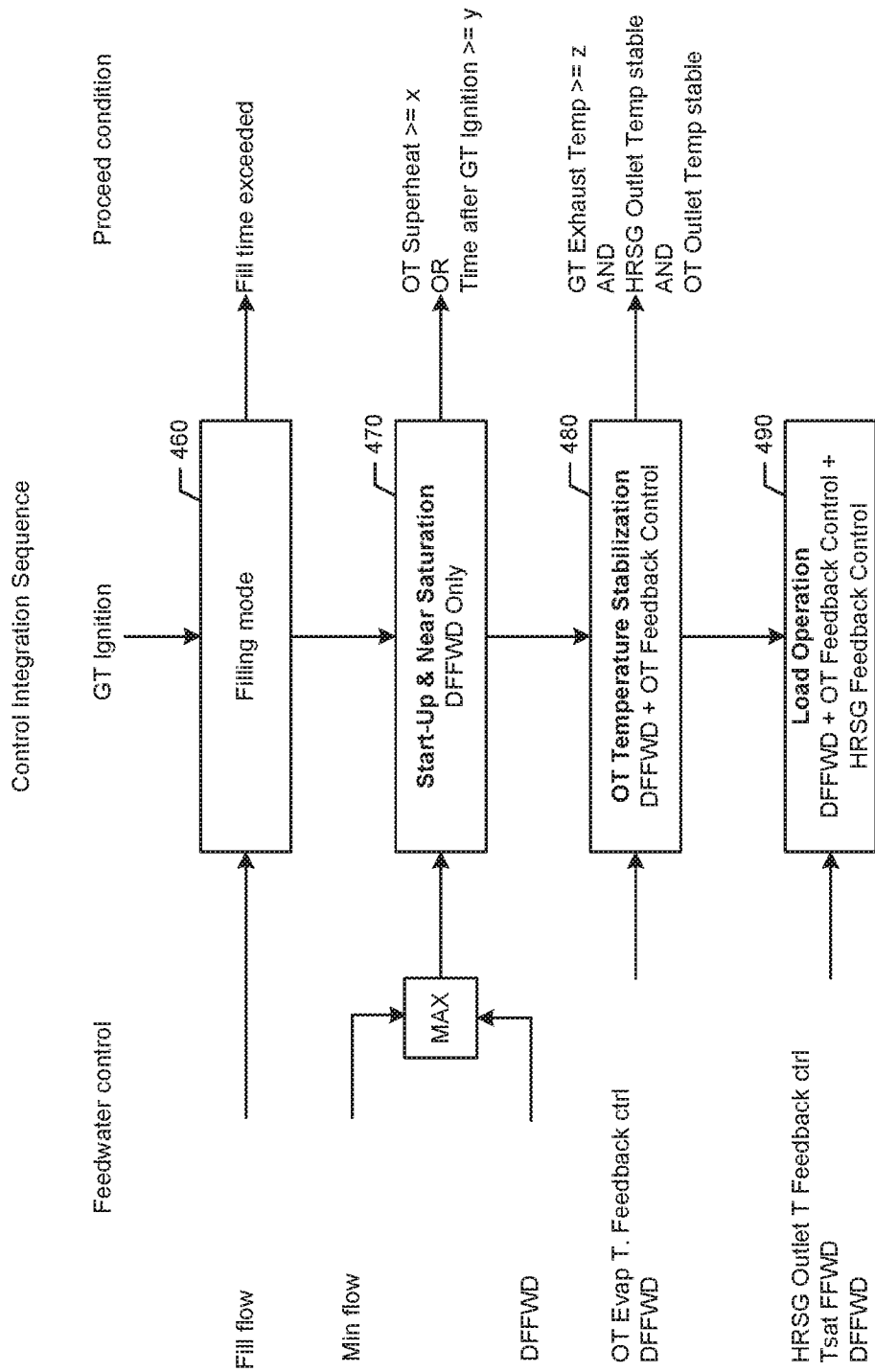
FIG. 6 is a flow chart of exemplary method steps in a controlled integration sequence using the once-through evaporator system of FIG. 2.

FIG. 6 shows the use of a controlled integration sequence 450 for the once-through evaporator system 100 after ignition and filling up to load operation. During the initial start-up phase of the once-though evaporator 100, before gas turbine loading, the steam 65 generated at the evaporator outlet is typically wet due to the low flue gas temperatures and mass flow. In this regime, it is advantageous to predict the feedwater flow demands by means other than temperature feedback control, which may be ineffective due to the non-responsiveness of steam temperature at the saturation point. The application of the dynamic feedforward (DFFWD) signal 325 that predicts the quantity of feedwater flow required based on heat balance considerations and system dynamics thus improves the response of the overall system.

At step 460 in filling mode, filling may be performed as described above. At step 470 in start-up and near saturation mode once the filling time has been exceeded, the feedwater flow rate may be change to the maximum of a given minimum flow rate and the flow rate determined by the dynamic feedforward signal 325. Once gas turbine loading starts, rapid rises in flue gas temperature and mass flow typically results in rapidly rising steam temperature, which cannot be reliably controlled by the dynamic feedforward signal 325 alone. Temperature feedback control thus may be required to supplement the dynamic feedforward signal 325 to ensure that peak temperatures remain below safety limits.

At step 480 in temperature stabilization mode, when either superheat at the evaporator outlet exceeds a given threshold via the temperature sensor 240 or a given maximum waiting time has elapsed from gas turbine ignition, the dynamic feedforward signal 325 may be supplemented by a temperature feedback control which is controlling the evaporator outlet temperature to a given superheat target schedule. The superheat target schedule is a reference table whose independent variable is the current saturation temperature of the steam at the evaporator outlet. An inappropriate application of feedback control may dominate the feedforward action and may result in a dry-wet cycle in the produced steam. During this phase, an appropriate superheat degree is targeted to stabilize overall operation. The exit stage temperature as determined by the exit stage temperature sensor 245 or otherwise may be considered stable once it remains within a defined band about a temperature set point for a specified minimum amount of time or if the difference between the temperature filtered with a slow time constant and the same temperature filtered with a fast time constant is within a defined band. The temperature stabilization mode remains active until the gas turbine exhaust temperature reaches a predefined threshold and the exit stage outlet temperature has been stabilized.

Once steam temperature transients have stabilized, live steam temperatures supplied to the steam turbine 60 may be controlled to a setpoint. Exit stage temperature feedback control thus may be used to set the steam temperature. At step 490 in load operation mode, a steam temperature setpoint for the exit stage outlet temperature may be defined and subsequently corrected based on interstage attemperator valve position or flow rate. The correction may include a negative bias applied to the steam temperature setpoint equal in value to an appropriately scaled and filtered measurement of interstage attemperator valve position or flow rate. Control of the superheat setpoint may be transferred from the superheat target schedule to the exit stage temperature controller 310 controlling the exit stage outlet temperature to a specified setpoint. As loading continues, the thermal load on the exit stages changes such that the temperature setpoint may be adjusted in response. A feedforward signal 326 based on the saturation temperature may be added such that feedback implicitly adjusts the evaporator superheat required and gives as an output the absolute evaporator temperature required.

The use of the controlled integration sequence 450 thus provides start-up consistency from any initial condition, reduced cycling of dry-wet conditions, and more stable steam temperatures driving the steam turbine 60. The controlled integration sequence 450 also may reduce overall start-up time due to quicker stabilization of the steam temperatures. Attemperator spray injections also may be reduced.

As described above, the once-through evaporator system 100 may use different types of feedforward signals 325 during operation to predict the dynamic response of the steam temperature in response to changes in process parameters such as temperature, pressure, mass flow rate, and the like. The PID controllers 300 thus dynamically supplement the feedwater mass flow rate set-point. The dynamic feedforward signal 325 may be calculated based on changes in certain process parameters over a specific time interval; not the actual values of the process parameters.

Figure 7:
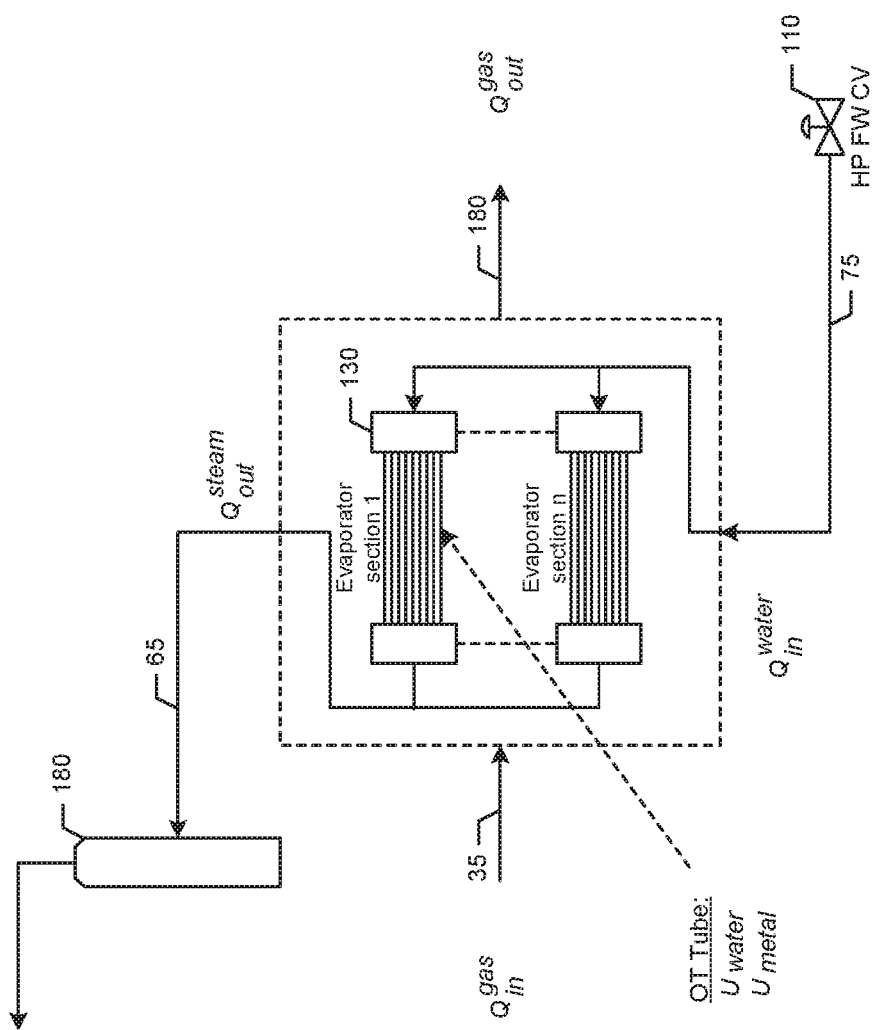
FIG. 7 is a schematic diagram of a number of evaporator sections in the once-through evaporator system of FIG. 2.
Figure 8:
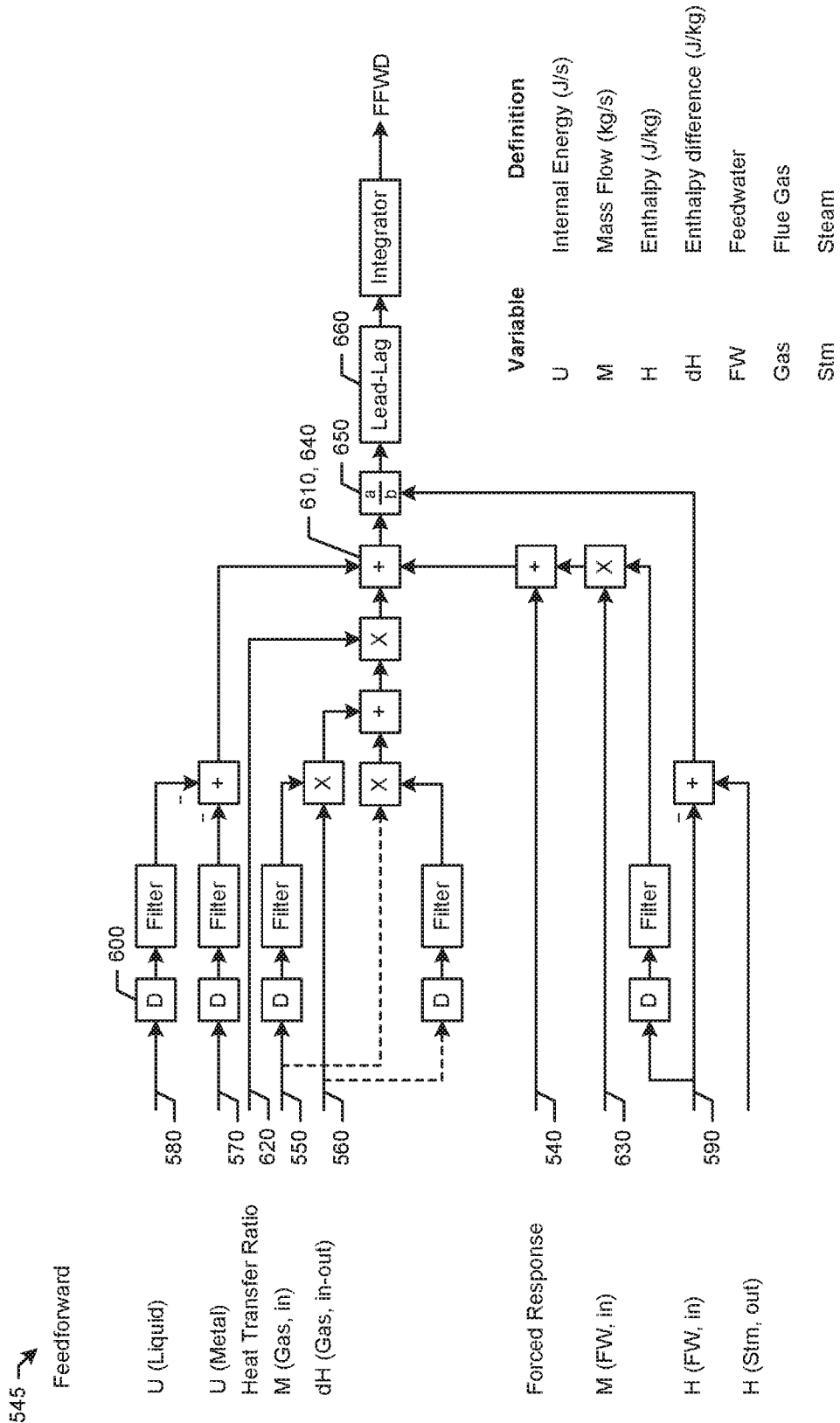
FIG. 8 is a schematic diagram of an unforced response in the once-through evaporator system of FIG. 2.

FIGS. 7 and 8 show an example of an unforced response scenario 545 in the feedwater mass flow rate. Generally described, the change in the steam temperature feedforward signal 325 at any given time may be calculated based on observable and/or estimated changes over a specific interval in multiple process parameters. The calculated change in the feedforward signal predicts the change that is required, at any point in time and at any starting condition, to keep the change in evaporator steam temperature at zero, at the current pressure, in response to changes in external disturbance variables. Specifically, the dynamic feedforward signal 325 may consider the gas mass flow rate heat transfer dynamics, the gas temperature heat transfer dynamics, and a theoretical heat transfer ratio.

A first input 550 may be a change in heat (Q) represented by a change in mass flow rate (M) of the combustion gases 35 in contact with the heat exchange surfaces of the once-through evaporator sections 130 as an external disturbance variable. A second input 560 may be a change in heat represented by a change in enthalpy (dH) of the combustion gases 35 at the inlet (upstream side) and/or at the outlet (downstream side) of the heat exchange surfaces of the once-through evaporator sections 130 as the external disturbance variable. A third input 570 may be change in heat represented by a change in the internal heat (U) absorbed by the metal in the evaporator tube walls of the once-through evaporator sections 130 based on gas side temperature and/or steam saturation temperature and/or feedwater temperature as the external disturbance variable, along with an estimate of the effective heat transfer mass of the evaporator tube walls. A fourth input 580 may be a change in heat (U) represented by a change in the internal heat absorbed by the water or fluid in the evaporator tubes of the once-through evaporator sections 130 based on gas side temperature and/or steam saturation temperature and/or feedwater temperature as an external disturbance variable, along with an estimate or online measurement of the fluid mass contained in the once-through evaporator sections 130. A fifth input 590 may be a change in heat represented by a change in inlet feed water enthalpy (H) as the external disturbance variable.

Figure 9:
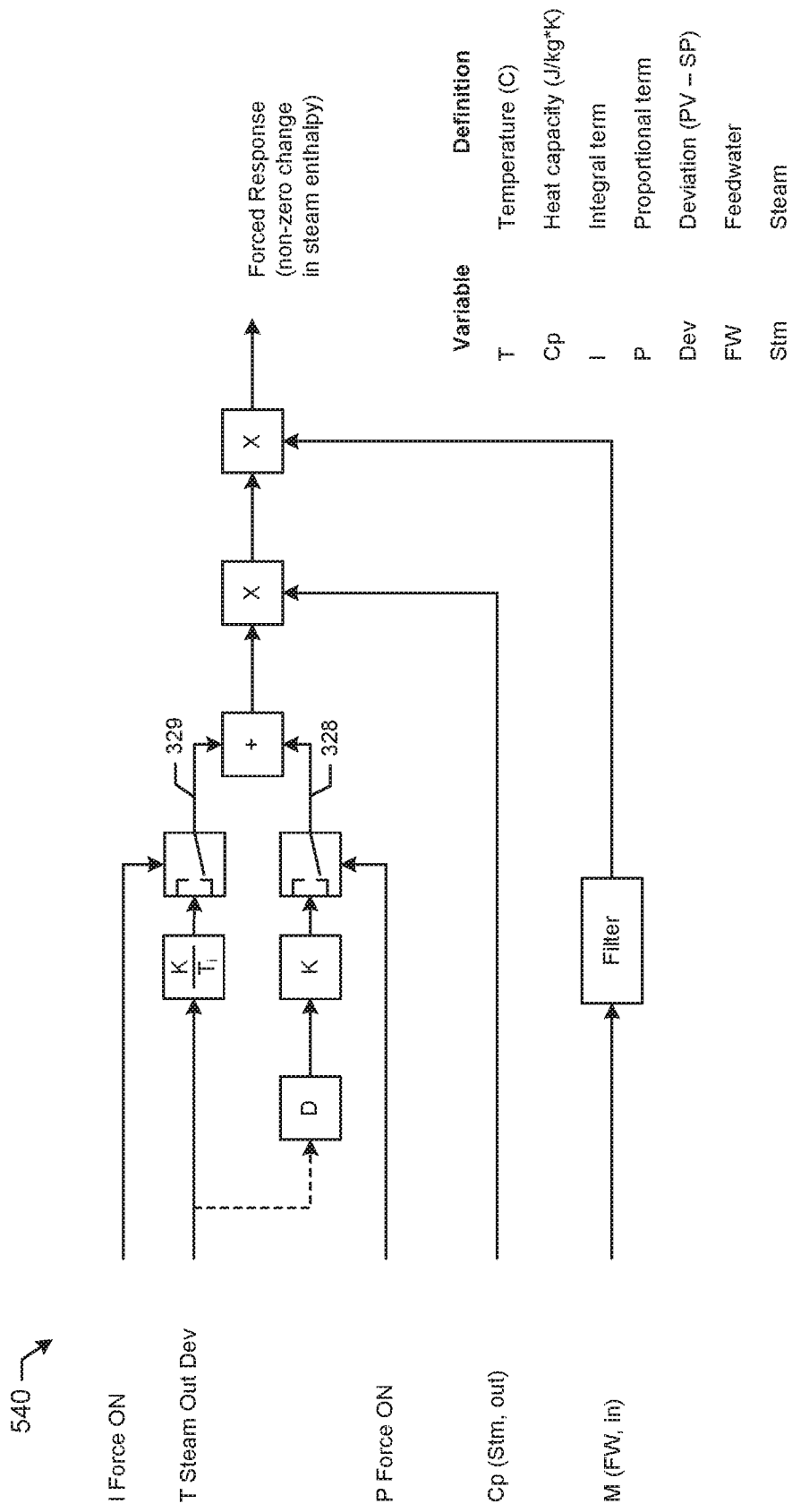
FIG. 9 is a schematic diagram of a set-point forced response in the once-through evaporator system of FIG. 2.

The dynamic feedforward signal 325 thus may provide an "unforced response" in feedwater mass flow rates based upon the process parameters as well as a "forced response" based on a desired change in the steam temperature set point. As is shown in FIG. 9, in a forced response scenario 540, the desired change is set to a non-zero value as the deviation term (T Steam Out Dev). The proportional 328 and integral 329 forcing terms are thus added and multiplied by the outgoing heat capacity of the steam (cp) and a steam flow rate estimate such as the filtered incoming feedwater flow rate (m) or an online measurement of the steam flow rate to produce a forced response signal 540. The force response signal 540 represents the change in feedwater required, in term of heat flow rate (W) to move the current steam temperature to its setpoint.

At step 600, dynamic filters (D) may be applied to each parameter described above individually to approximate the dynamic change in steam temperature in response to the change in each respective parameter. At step 610, these responses are combined with the forced response signal 540, a heat transfer ratio 620, and the incoming mass flow rate 630 of the feedwater 75 into an overall predicted change in steam temperature caused by the external disturbance variables. At step 640 if a non-zero change in steam temperature is desired, an appropriate feed-forward change is calculated and added to the previously calculated change in feedwater mass flow to drive the steam temperature in the desired direction. At step 650, the sum of the above delayed changes in heat may be divided by a reference enthalpy to convert the value into a change in feedwater mass flow. At step 660, to account for the effect of delayed process response in the steam temperature to a change in feedwater mass flow, lead-lag compensation may be applied to the previously calculated change in feedwater mass flow.

The feedforward signal 325 thus is fundamentally based on a dynamic heat balance over the evaporator sections 130, incorporating heat propagation time lags and heat accumulation/decumulation terms. This is different from approaches using a steady state heat balance that considers instantaneous heat transferred by the exhaust gas equal to the heat absorbed by the flow medium. The steady state heat balance approach does not consider the heat exchanged to be unbalanced over time. The feedforward signal 325 thus improves the performance and robustness of process controls in the once-through evaporator system 100 when steam temperature alone is not a reliable indication of the required feedwater mass flow. Specifically, improved performance and control stability during transient, load cycling, and low load operation.

Figure 10:
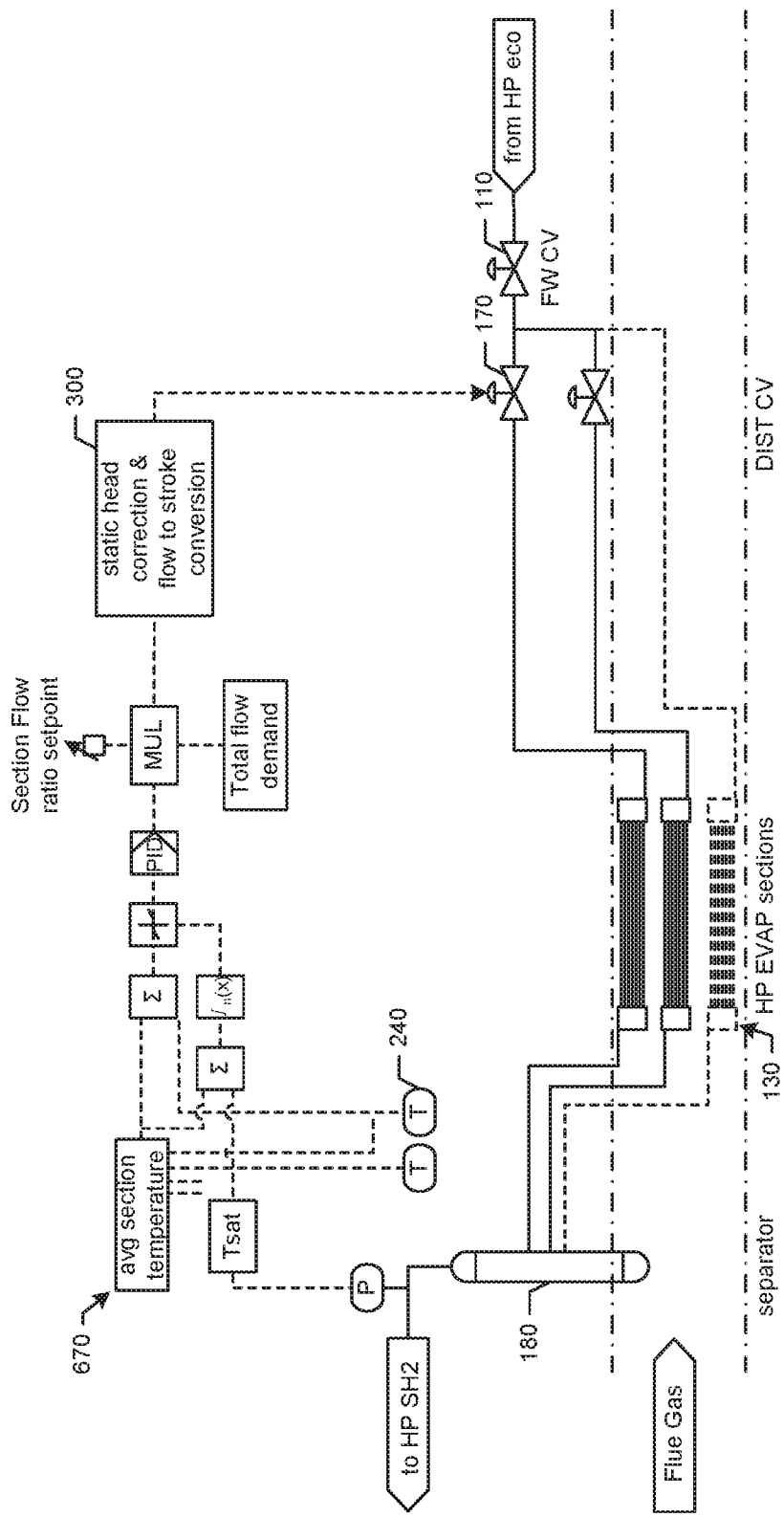
FIG. 10 is a schematic diagram of a temperature control system for use in the once-through evaporator system of FIG. 2.

FIGS. 10 through 13 show specific use cases of the feedforward signals. FIG. 10 shows a temperature control system 670. The temperature from each evaporator section controller 300 may be averaged to create the temperature set-point to achieve uniform section outlet temperatures. The temperature set-point may be biased up or down to achieve secondary control objectives such as elimination of small temperature offsets and/or between setpoint and controlled variables.

Figure 11:
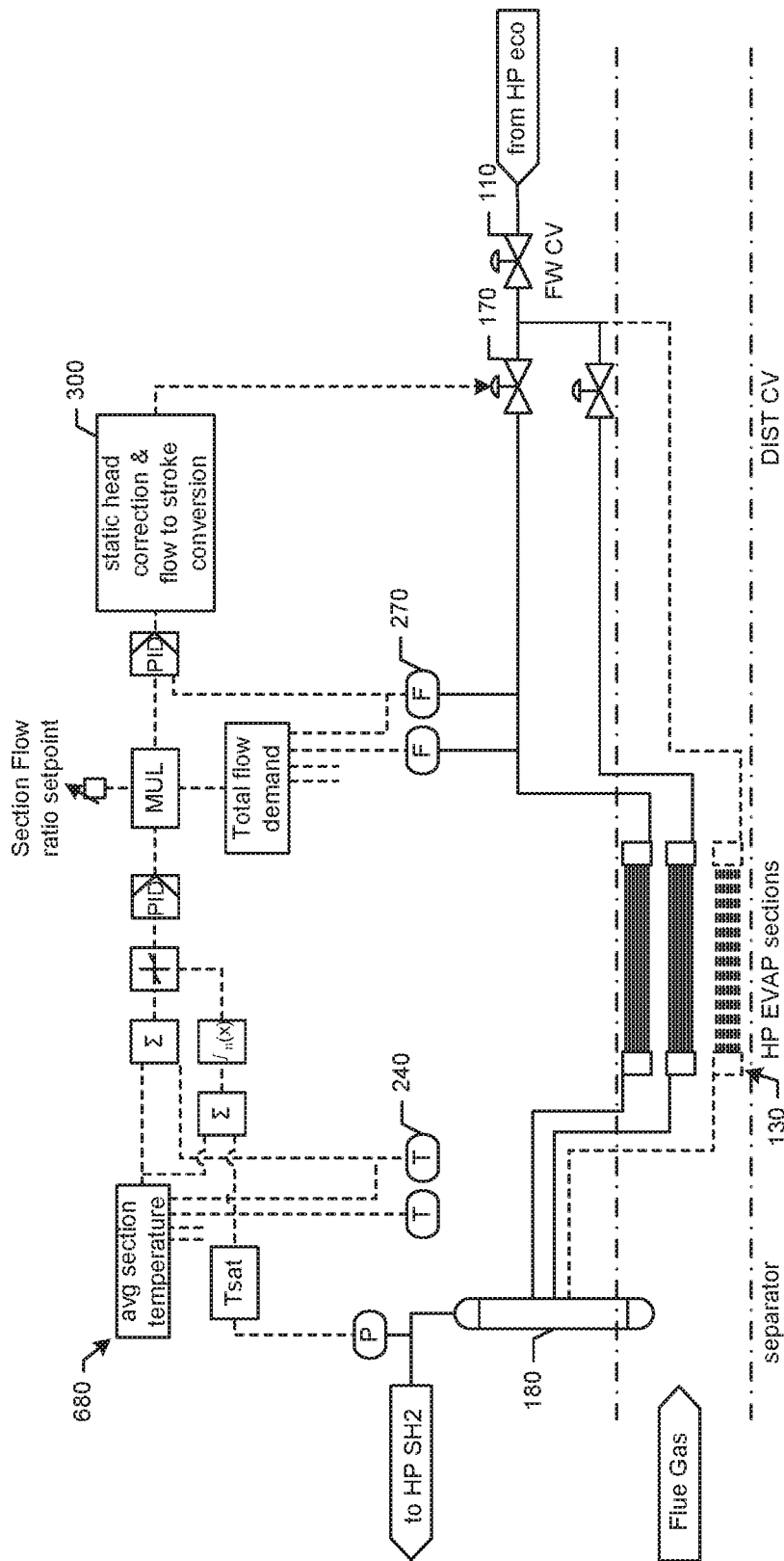
FIG. 11 is a schematic diagram of a temperature/flow control cascade system for use in the once-through evaporator system of FIG. 2.

FIG. 11 shows a temperature/flow control cascade 680. At low gas turbine loads, the steam flow may become very low. This may have the effect of increasing the response time of the steam temperature to a change in flow significantly and the secondary effect of introducing significant amounts of dead time. At these operating conditions, conventional PID-based closed-loop control may struggle as it does not receive timely feedback to changes in output.

Measured feedwater flow from a flow meter 270 or feedwater flow demand for each evaporator section 130 may be used to calculate the pressure drop of the entire flow path of that section from the distribution valve 170 to the water separator 180. Specifically, the static head for each once-through evaporator section 130 may be used to calculate the required pressure drop of each distribution valve 170 at a given measured or commanded flow rate. By knowing the characteristic of the distribution valve 170, this may be converted into a corresponding valve stroke.

A minimum pressure drop across the distribution valves 170 also may be maintained by the above calculation to maintain controllability (which may otherwise be lost if pressure drop reduces to small or zero values). A valve position boundary (such as one valve at a pre-defined position) may be imposed as well to reduce the degrees of freedom by one. The calculated valve stroke may be used to position the distribution valves 170 open loop. The calculated valve stroke also may be used as a feedforward for section temperature controller, section temperature/flow, or temperature/flow ratio controller cascades.

Figure 12:
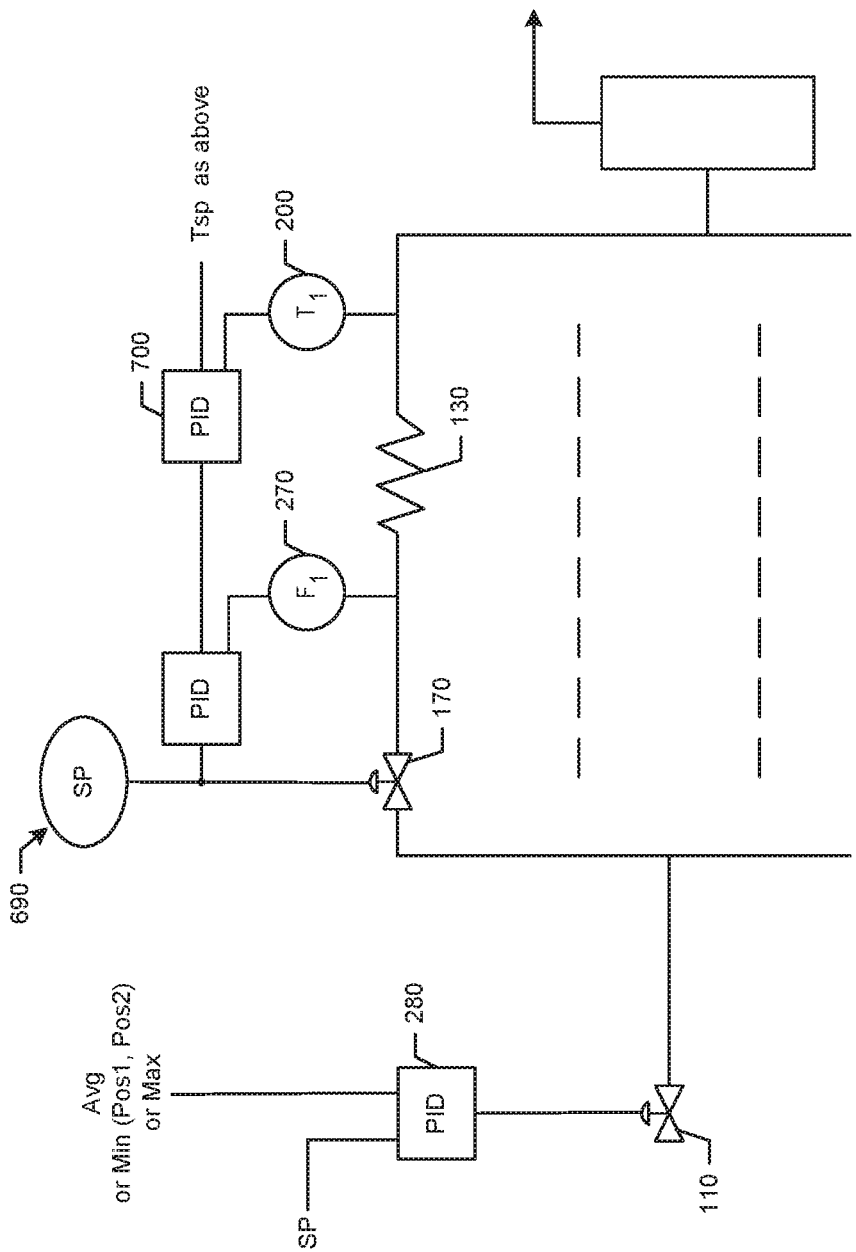
FIG. 12 is a schematic diagram of a section flow control system for use in the once-through evaporator system of FIG. 2.

FIG. 12 shows a section flow control system 690. In order to allow for more granular control of feedwater flow 75 to each once-through evaporator section 130, sectional flow controllers 700 may be used. This may introduce a degree of freedom problem, however, if the flow continues to be controlled by the main control valve 110, i.e., multiple valves on the same line attempting to control the same or a subset of the same flow. To solve this problem, the main control valve 110 may instead ensure that the downstream distribution valves 170 operate within a desired operating range of valve positions. In this arrangement, flow may be controlled individually to each evaporator section 130 by the sectional flow controller 700 connected to each distribution valve 170. This allows the main control valve 110 to control its position such that the distribution valves 170 remain within their preferred operating range while simultaneously maintaining sufficient feedwater flow.

Figure 13:
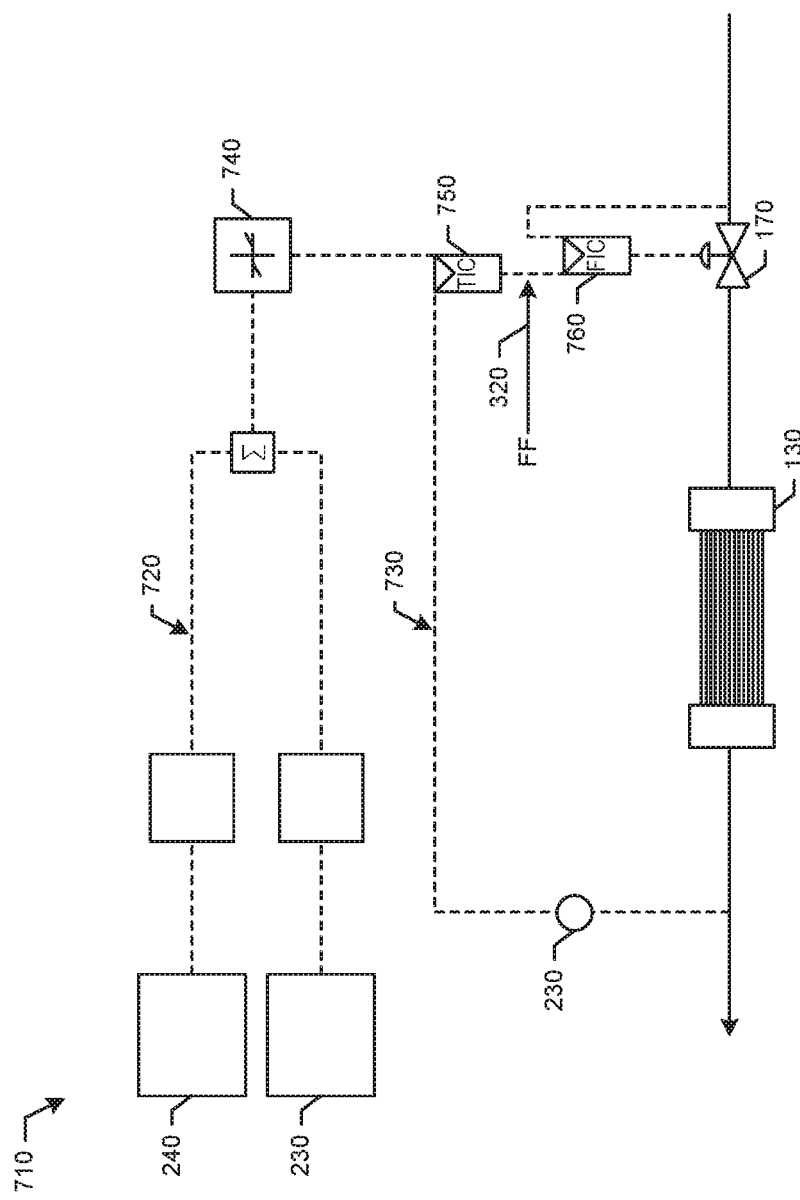
FIG. 13 is a schematic diagram of a deadband flow control system for use in the once-through evaporator system of FIG. 2.

FIG. 13 shows a deadband flow control system 710. The deadband flow control system 710 may include an outer temperature control loop 720, an inner flow control loop 730, and a deadband signal 740 ($\delta_T$). The outer temperature control loop 720 may be in communication with the water separator temperature sensor 240, each once-through evaporator section temperature sensor 230, and a distribution valve temperature controller 750. The inner flow control loop 730 may be in communication with the once-through evaporator section temperature sensor 230 and a distribution valve flow controller 760. The outer temperature control loop 720 may track the water separator outlet steam temperature as determined by the water separator temperature sensor 240 and the evaporator outlet steam temperature $T_{out}$ as determined by the once-through evaporator section temperature sensors 230 to determine a preliminary set point $T_1$ for the temperature controller 750. If $T_{out}$ is within the range of $T_1-\delta_T$ and $T_1+\delta_T$, then the set point will track $T_{out}$. If not, $T_1$ will be used. The output of the outer temperature control loop 720 may combine with a feedforward signal 320 to generate a set point for the inner flow control loop 730. Other components and other configurations may be used herein.

The deadband flow control system 710 thus may improve stability and performance of temperature dependent control strategies for flow distribution. The deadband flow control system 710 stabilizes evaporator exit temperatures at any load conditions and maintains superheated conditions at the outlet of the water separator 180. Moreover, the deadband flow control system 710 may reduce flow oscillations at low loads and assist in stabilizing the positions of the distribution valves 170. Uniform temperature distribution thus may promote better operating behavior and overall material life. The systems described herein thus increases robustness of control while preventing oscillatory interference between valves.

Figure 14:
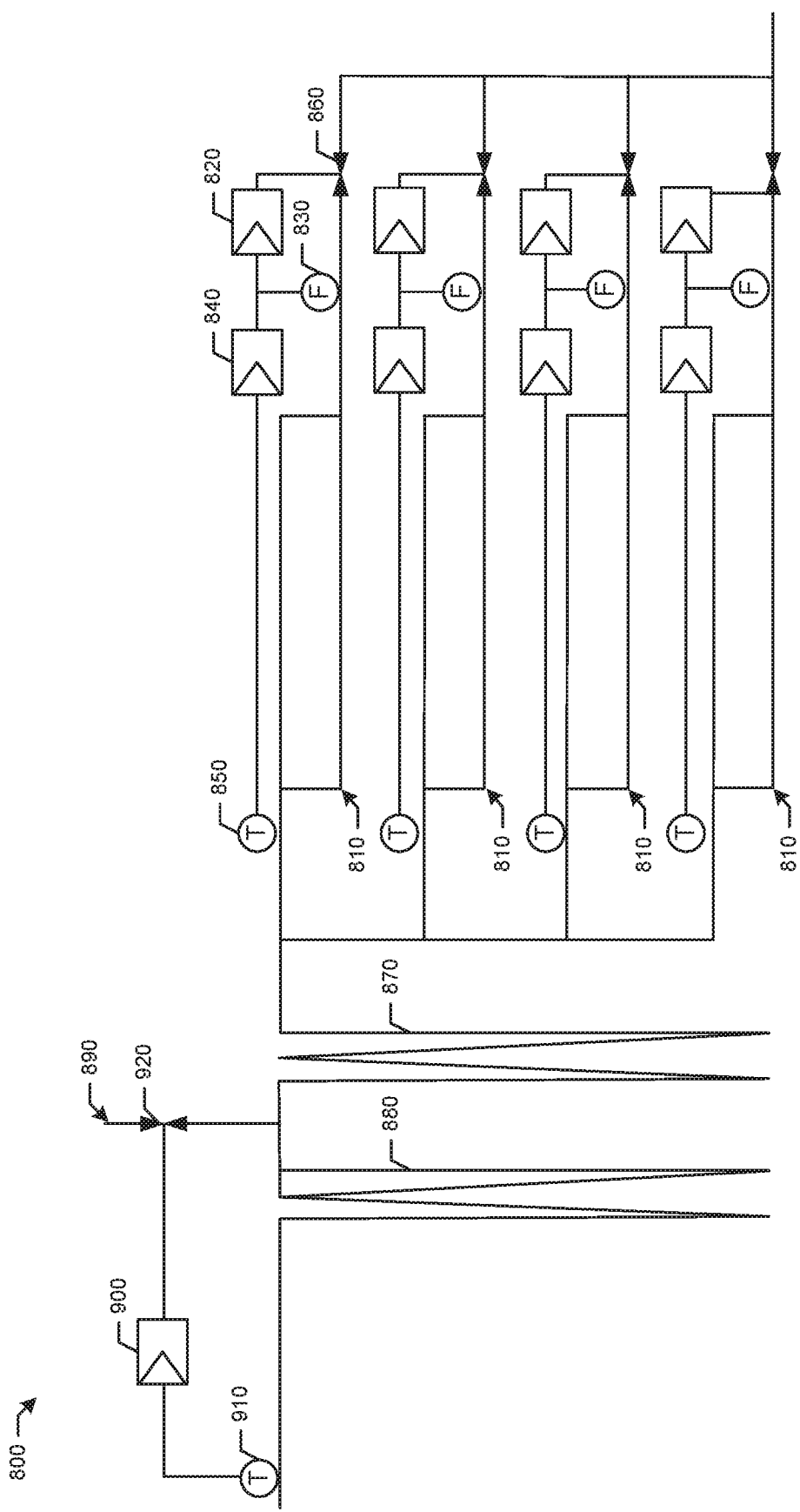
FIG. 14 is a schematic diagram of an alternative embodiment of a once-through evaporator system as may be described herein.

FIG. 14 shows a further embodiment of a once-through evaporator system 800 as may be described herein. In conventional systems, the evaporator sections are operated in re-circulation mode in the early phases of start-up. The evaporator sections may be fed with a constant minimum feedwater flow at gas turbine load, which leads to wetness at the evaporator outlet. The liquid water may be collected by means of the water separator and re-circulated. Typically there are two desuperheaters or attemperators, one downstream of the evaporator sections and one between two superheater sections. The attemperators may be sized to attemperate the live steam temperature to suit steam turbine requirements in the course of start-up. A minimum steam flow, however, may be required before spraying is allowed. Given such, there may be periods when no control of the outlet temperature is possible which could have an impact on component lifetime. Moreover, the spray water flow may be limited because complete evaporation of the injected water must be achieved.

In the present embodiment, the once-through evaporator system 800 may include enlarged once-through evaporator sections 810. The enlarged once-through evaporator sections 810 may be enlarged by twenty percent or more as compared to conventional devices. The enlarged evaporator sections 810 essentially combine what was the existing once-through evaporator sections 130 and the first superheater 190 with a corresponding reduction in the overall superheater surface area. Each enlarged once-through superheater section 810 may include a flow controller 820, a flow meter 830, a temperature controller 840, and a temperature sensor 850 in communication with a distribution valve 860. In this example, only two superheaters may be positioned downstream of the enlarged once-through evaporator sections 810, a first superheater 870 and a second superheater 880 with a single attemperator 890 positioned therebetwen. The attemperator 890 may be in communication with a flow of feedwater. The attemperator 890 may have a temperature controller 900 and a temperature sensor 910 in communication with a flow control valve 920. Other components and other configurations may be used herein.

The use of the enlarged once-through evaporator sections 810 allows for the removal of the water separator 180 and the associate recirculation system. Moreover, the main control valve 110 may be eliminated. The once-through evaporator system 800 thus may have improved flexibility of operation in a simplified configuration.

In the upper load range (roughly above 30% steam generation), the thermal inertia may be lower and the feedwater control may be capable of achieving a good control over the temperature at the outlet. In such a situation, the additional surface area may be used to actively over-feed the enlarged once-through evaporator sections 810 and shift the evaporator endpoint close to the end. The enlarged once-through evaporator sections 810 therefore make it possible for the feedwater control to take over this function and eliminate one of the superheaters. In the lower load range (roughly below 30% steam generation) the thermal inertia may be high and the achievable control quality of the feedwater control loop may be rather poor and may lead to saturated conditions at the evaporator outlet. Water and steam thus may be separated in the water separator and the water may be re-circulated. The additional surface area of the enlarged once-through evaporator sections, however, serves as a buffer and provides additional margin for outlet temperature variations. In such a situation, outlet temperature control may not be needed. Rather, the enlarged once-through evaporator sections 810 may be fed with the amount of feedwater corresponding to the actual heat input such that the evaporation endpoint may "breathe freely."

The once-through evaporator system 800 thus provides simplification as well as an overall cost reduction while maintaining good steam temperature control. Moreover, by eliminating the water separator and the recirculation equipment, the once-through evaporator system 800 may have a reduced water footprint with no water dumping. No water circulation also means that all of the heat absorbed in the early phase of start-up is used for steam generation. Early steam generation is useful to cool the hot sections of the superheaters so as to avoid thermal fatigue.

Figure 15:
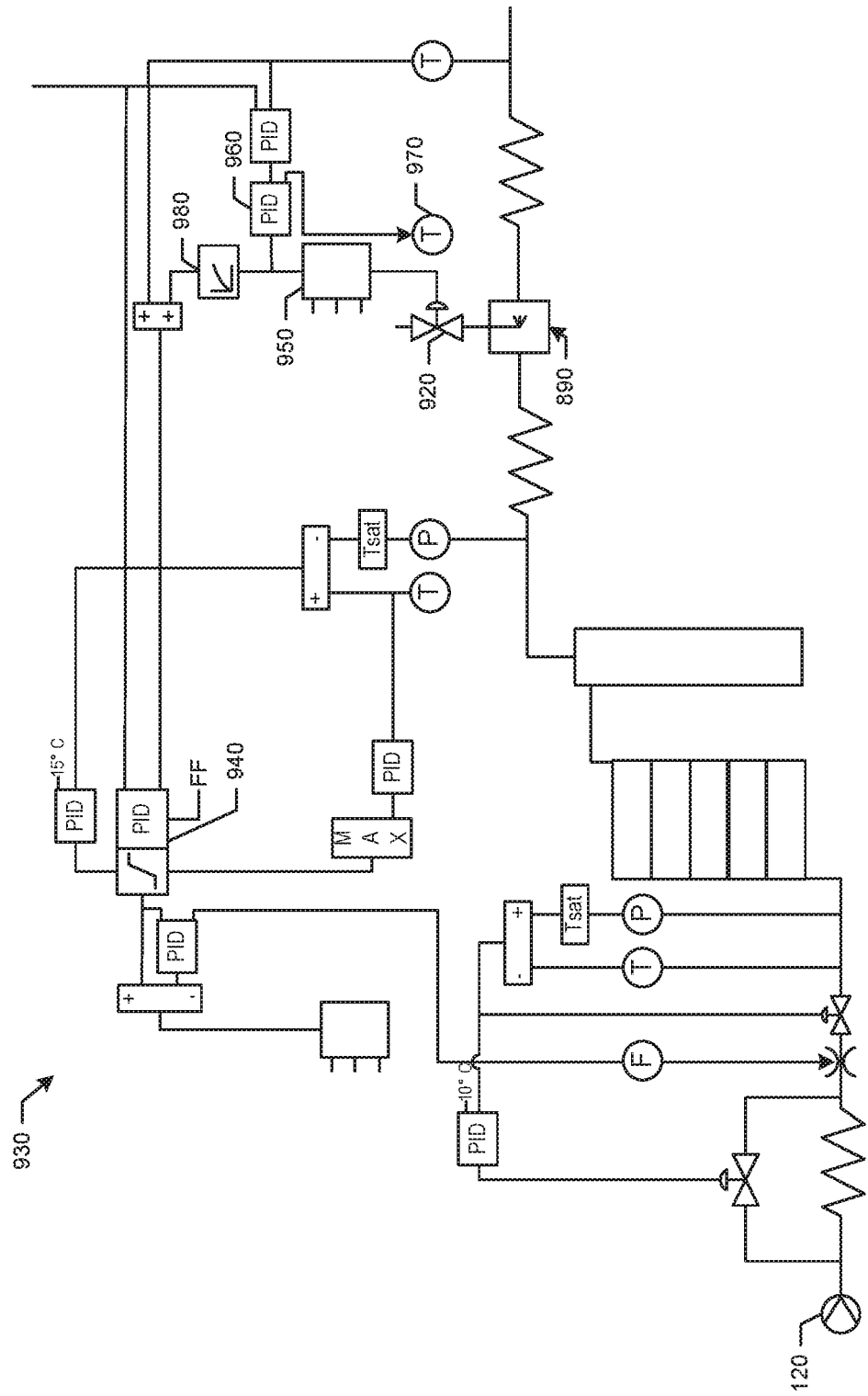
FIG. 15 is a schematic diagram of a spray control system that may be used with the once-through evaporator system of FIG. 14.

FIG. 15 shows a simplified spray control system 930. The simplified spray control system 930 may be used with the once-through evaporator system 800 or otherwise. Typically, the outlet temperature may be controlled by spray injection upstream of the final superheater. A steam temperature upstream of the spray injection may be controlled by the boiler feedwater flow. The two controllers thus may be coordinated via a dynamic offset on the set-point temperature communicated to the feedwater controller. This offset may be selected so as to keep the spray valve operating at an intermediate opening. This concept requires non-zero spray flow to control the boiler outlet temperatures at all times.

In this example, the flow control valve 920 of the attemperator 890 may be in communication with a main feedwater controller 940 via a flow to stroke converter 950 as well as a spray controller 960 and a temperature sensor 970. Moreover, a PT element 980 also may be in communication with the main feedwater controller 940 and the flow to stroke converter 950.

In this example, the outlet temperature may be directly controlled by the main feedwater controller 940. The spray controller 960 may intervene in (fast) transients, where the outlet temperature shows transient excursions above a predetermined set-point. The spray flow demand generated by main feedwater controller 940 may be communicated first to the flow control valve 920, securing the required amount of water immediately. At the same time, this initiation demand may be communicated via the PT element 980 to the main feedwater controller 940, such that the required amount of water will be supplied directly from the feedwater.

The spray control system 930 may be tuned such that the flow control valve 920 remains closed most of the time so as to avoid exergetic losses associated with cold water mixing, particularly at part load. The spray control system thus may minimize the spray flow so as to exploit the "breathing capability" of the once-through evaporator system 800 and the like.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A system, comprising:
a once-through evaporator system, comprising:
a plurality of once-through evaporator sections, wherein each of the plurality of once-through evaporator sections comprises a distribution valve and a level sensor;
a controller configured to control filling of the plurality of once-through evaporator sections for a first duration of time during a start-up procedure of the once-through evaporator system, wherein the controller is in communication with each distribution valve, the controller is configured to provide each distribution valve with a position set point, and the controller is configured to bias the position set point via a first feedforward signal based on a fill level as determined by the level sensor in each of the plurality of once-through evaporator sections for the first duration of time during the start-up procedure.

2. The system of claim 1, wherein the controller comprises a flow controller.

3. The system of claim 1, wherein the controller comprises a proportional-integral-derivative controller.

4. The system of claim 1, comprising a heat recovery steam generator (HRSG) having an economizer section, an evaporator section, and a superheater section, wherein the once-through evaporator system is a part of the evaporator section, wherein the HRSG is configured to transfer heat from a gas turbine exhaust gas to a feedwater flowing through the plurality of once-through evaporator sections.

5. The system of claim 1, wherein each position set point is independently biased in each of the plurality of once-through evaporator sections.

6. A method, comprising:
feeding a feedwater into a once-through evaporator section through a distribution valve at a feedwater flow rate during a start-up procedure of a once-though evaporator system;
controlling the feedwater flow rate in a filling control mode during the start-up procedure via a flow controller controlling the distribution valve, wherein the filling control mode comprises biasing a set point via a first feedforward signal based on a fill level in the once-through evaporator section, wherein the fill level is based on feedback from a level sensor of the once-through evaporator section, and wherein the set point comprises a position set point for the distribution valve;
controlling the feedwater flow rate via a dynamic feedforward signal in a second control mode after the filling control mode during the start-up procedure; and
controlling the feedwater flow rate via the dynamic feedforward signal and temperature feedback control based on once-through evaporator section exit temperatures in a third control mode after the second control mode.

7. The method of claim 6, comprising completely draining the once-through evaporator section prior to the start-up procedure.

8. The method of claim 6, wherein controlling the feedwater flow rate via the dynamic feedforward signal in the second control mode occurs without the temperature feedback control.

9. The method of claim 6, wherein controlling in the second control mode occurs at least partially before loading of a gas turbine, wherein controlling in the third control mode occurs at least partially after initiating the loading of the gas turbine, and wherein the once-through evaporator section transfers heat to the feedwater from an exhaust gas generated by the gas turbine.

10. The method of claim 6, wherein controlling the feedwater flow rate via the dynamic feedforward signal in the second control mode begins after a filling time of the filling control mode and near a saturation point during the start-up procedure.

11. The method of claim 6, wherein controlling in the third control mode lasts at least until a stabilization of an exit temperature of the once-through evaporator section, and the stabilization is based on:
the exit temperature remaining in a predetermined range for a predetermined time;
an upstream temperature on a gas side exceeding a threshold; and
a change in a superheater exit temperature downstream of the once-through evaporator section not exceeding a predetermined range for a predetermined time.

12. The method of claim 11, comprising controlling the superheater exit temperature downstream of the once-through evaporator section to a predetermined set point.

13. The method of claim 12, comprising adding a feedforward signal based upon a saturation temperature to a superheater controller.

14. The system of claim 1, wherein the controller is configured to control the filling in a filling control mode for the first duration of time, the controller is configured to control a feedwater flow rate through each of the plurality of once-through evaporator sections via a second feedforward signal in a second control mode during the start-up procedure, the controller is configured to control the feedwater flow rate via the second feedforward signal and a temperature feedback control based on once-through evaporator section exit temperatures in a third control mode during the start-up procedure, the controller is configured to execute the second control mode after the filling control mode, and the controller is configured to execute the third control mode after the second control mode.

15. The system of claim 14, wherein the first duration of time begins after ignition of a gas turbine, the controller is configured to execute the second control mode substantially before a loading of the gas turbine, the controller is configured to execute the third control mode substantially after initiation of the loading of the gas turbine, and each of the plurality of once-through evaporator sections transfers heat to the feedwater from an exhaust gas generated by the gas turbine.

\* \* \* \* \*